Figure 3:
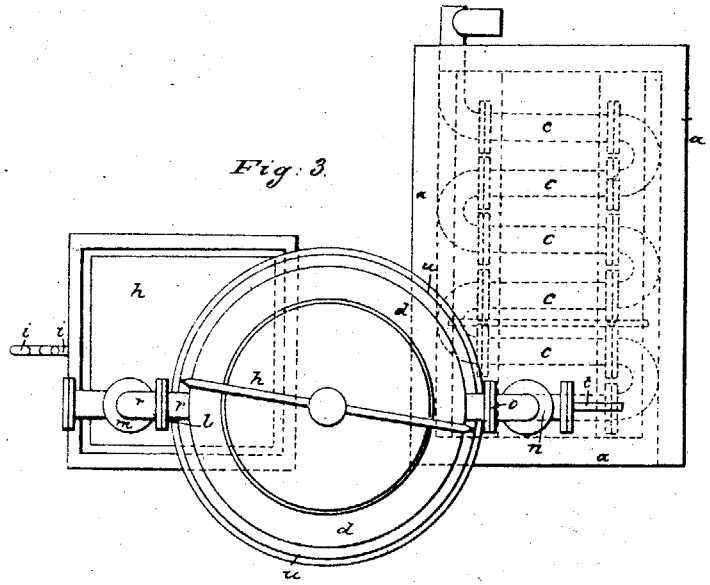

J. HOWARTH.
2 Sheets—Sheet 1.
Oil Still.
No. 1,605.
Reissued Jan'y 19, 1864.
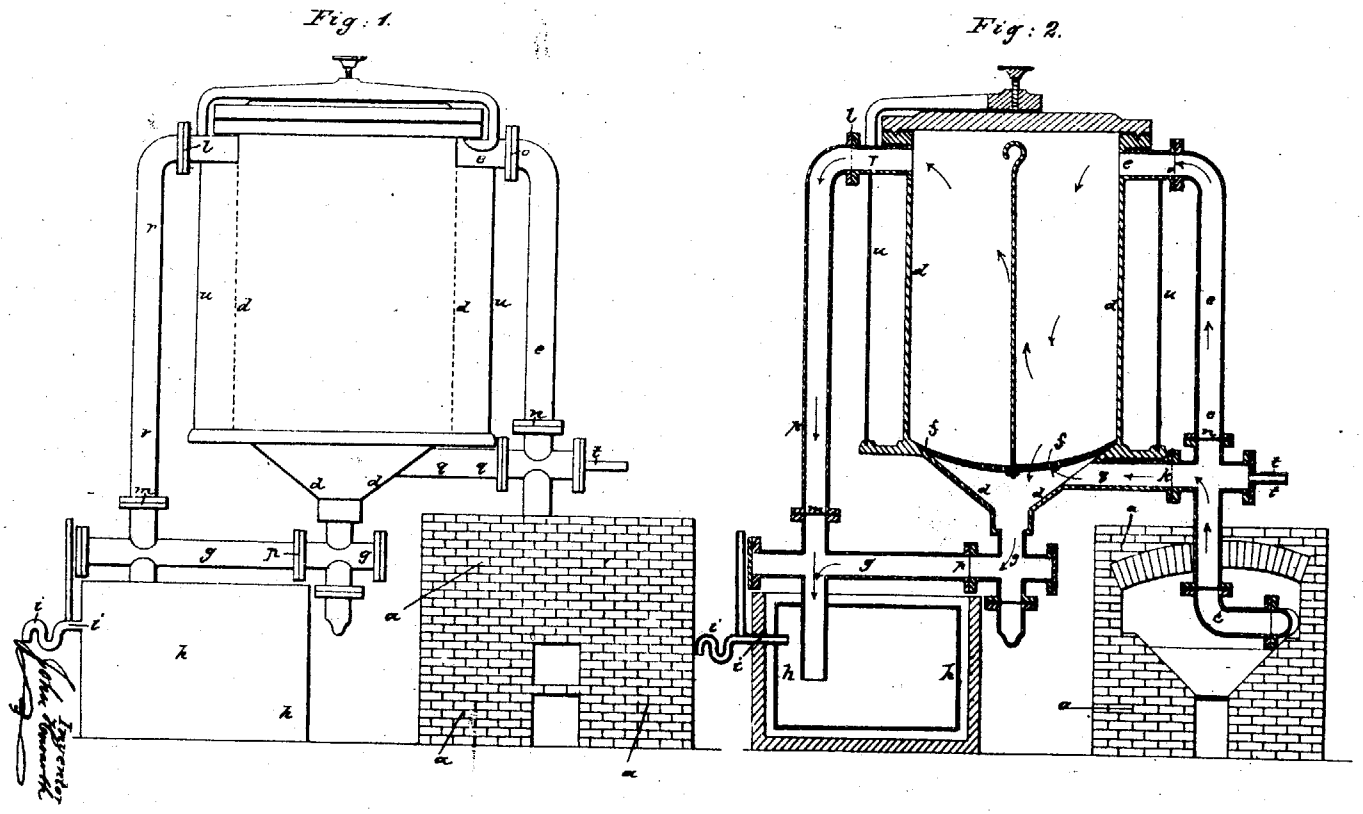
Witnesses:
Joseph Quirk
Albert W. Brown
Inventor
John Howarth

J. HOWARTH.

Oil Still.

2 Sheets—Sheet 2.

No. 1,605.

Reissued Jan'y 19, 1864.

Witnesses:

Joseph Gwatt

Albert H. Brown

Inventor:

John Howarth

UNITED STATES PATENT OFFICE.

JOHN HOWARTH, OF SALEM, MASSACHUSETTS.

IMPROVED METHOD OF DISTILLING COAL, &c.

Specification forming part of Letters Patent No. 25,568, dated September 27, 1859; Reissue No. 1,605, dated January 19, 1864.

*To all whom it may concern:*

Be it known that I, JOHN HOWARTH, of Salem, in the county of Essex and State of Massachusetts, have invented a new and useful method of extracting the volatile products from coal and other substances yielding pyrogenous oils and gases; and I do hereby declare that the following description, taken in connection with the accompanying drawings, hereinafter referred to, forms a full and exact specification of the same, wherein I have set forth the nature and principles of my said improvements by which my invention may be distinguished from all others of a similar class, together with such parts as I claim and desire to have secured to me by Letters Patent.

The figures of the accompanying plate of drawings represent my improvements.

Figure 1, Plate 1, is a side elevation of an apparatus exemplifying my improved method of extracting the volatile products of coal and other substances yielding pyrogenous oils. Fig. 2, Plate 1, is a longitudinal vertical section. Fig. 3, Plate 2, is a top view of the same.

In the process heretofore used for extracting the volatile products from coal and other carbonaceous substances, it has been found that there is a certain temperature at which vaporization takes place, and which temperature it has been the aim of all such processes to maintain as nearly as possibly, as any excess of heat beyond this desired temperature produces gases which cannot be converted into oily vapors, and are therefore lost, and any considerable diminution of heat below the proper point prevents, of course, the attainment of the desired result—viz., the producing of gases and oleaginous vapors. But in the many kinds of apparatus heretofore used the substances from which the oil is to be extracted have been exposed either to heat in a retort, which is a roasting or baking process, or to the direct action of an ignited mass of fuel, or in such manner as to allow the products of combustion to pass through and mingle with the coal or other substances to be acted upon by the heat, by either of which modes it is impossible, even by the utmost care and skill, to produce and maintain uniformly the exact temperature desired, and no other, during the entire operation, and consequently the oily vapors cannot be constantly forming. In all these cases the temperature can be lowered only by diminishing the draft, which of course lessens the volume of heated currents passing through the apparatus, and thereby materially checks the rapidity with which the vapors are formed.

The object of the present invention is to maintain the temperature always and during the whole operation at the vaporizing-point, and no other, and in such a manner that the volume of heated currents passing through the material to be acted upon shall not at any time be diminished, or the rapidity with which the vapors are formed during the process suffer diminution, as a small volume of the heated currents at the proper combustion cannot, it is evident, produce such a quantity of vapors or so rapidly as a larger volume at the same temperature. I effect the desiderata by subjecting the material from which the oleaginous vapors are to be formed to a current of heated air of the requisite temperature, or to a volume of superheated steam, or to both heated air and superheated steam combined, the currents of air or superheated steam being forced vertically, or nearly so, through the material to be acted upon under a slight pressure. By this mode the degree of heat can always be regulated and kept at the most advantageous temperature—viz., that of vaporization, without being dependent upon the fluctuations to which the various modes of heating for similar purposes have heretofore been subject, and without diminishing the volume of currents passing through the apparatus, the regulating being effected, should the degree of heat become too great, (which is the greatest difficulty experienced in all processes for forming oily vapors,) simply by admitting cold air or steam from the boiler, to mingle with the other currents being forced through the apparatus, the danger of keeping the temperature too low being but slight, as it is evident that there will be but little difficulty in keeping the air or steam up to the proper degree of heat, as a comparatively small fire is needed for the purpose. It will be seen, also, that by this mode every portion of the material from which the volatile products are to be extracted is acted upon equally and at the same time by a heated current of the requisite temperature, which cannot be effected where the heat is merely that of conduction by metal or by direct contact of the products of combustion with the material to be acted upon.

*a a* in the accompanying drawings represent a brick furnace, within which and at a suitable distance above the grate-bars *b b* is placed a worm or coil of pipes, *c c*, through which steam from a boiler or atmospheric air, either separately or in combination, is forced under slight pressure, and heated in the furnace *a a* to the required temperature, and then passed to the cylinder *d d*, filled with the coal or other substances from which the volatile products are to be extracted.

In the drawings I have shown two modes in which the heated currents may be conducted through the cylinder *d d*—viz., from the bottom to the top and from the top to the bottom, as may be most desirable. When substances that melt in the retort are used, I prefer to have the heated air or superheated steam pass into the cylinder at the bottom; but when this is not the case the currents should pass in at the top. The red arrows in Fig. 2 show this latter method, the air or steam passing from the heated coil of pipes *c c* up the tube *e e* and in at the top of the cylinder *d d*, whence it is forced down through the coal or substance to be acted upon, passing through the perforated plate or diaphragm *f*, that sustains the charge, into a pipe, *g*, that leads to the condenser *h h*. The condensed products are delivered at the bent tube *i* and the gas at the vertical pipe *i'*, and which then can be purified by any of the usual methods. While conducting the heated current in this, it will be evident that the communications at *k l m* must be cut off by valves, cocks, or other suitable devices. The blue arrows in Fig. 2 show the manner of passing the heated currents through the cylinder *d d*, and the coal or other substances therein from the bottom to the top, the communications at *k*, *l*, and *m* being of course opened and those at *n*, *o*, and *p* closed, when the heated air or superheated steam passes from the worm *c c* into the pipe *g*, up through the perforated plate *f* and cylinder *d d* and its contents into the pipe *r r*, and then downward into the condenser *h h*, when the products are drawn off, as before, at the bent tube *i*. The superheated steam or air, when at too high a temperature, can quickly be reduced to the proper degree of heat without diminishing the volume of the heated current passing through the cylinder *d d* by admitting steam directly from the boiler through a pipe, *t*, or by allowing cold air to mingle with the heated currents in any proper manner.

*u u* is an outer cylinder or casing, holding a packing of dry clay or plaster to prevent the escape of heat from the cylinder *d d*. The coke, after the process is completed, can be readily removed, as it is only necessary to hoist the plate *f* by means of a hook, *v*, Fig. 2. The cylinder *d d* is then recharged, and the process goes on as before.

Having thus described my improvements, I shall state my claims as follows:

1. Distilling coal or other carbonaceous substances for the production of oils, gases, vapors, &c., by passing through the material to be acted upon a current of superheated steam in one body, in a vertical plane, or nearly so, through an upright retort—that is, so that a body of superheated steam shall come in contact with every portion of the said material—as set forth.

2. Forming oleaginous vapors from coal or other substances yielding pyrogenous oils by passing through the material to be acted upon air combined with superheated steam, substantially in the manner and for the purposes set forth.

3. Passing through the material to be acted upon superheated steam in combination with steam direct from the boiler, for the purpose of regulating the temperature, as set forth.

JOHN HOWARTH.

Witnesses:
ALBERT W. BROWN,
FREDERIC A. SAYER.